United States Patent
Bridges et al.

(10) Patent No.: US 7,047,612 B2
(45) Date of Patent: May 23, 2006

(54) METHOD FOR REPAIRING A CASTING

(75) Inventors: Michael D. Bridges, Luka, MS (US); Leonid Chuzhoy, Dunlap, IL (US); Christopher A Kinney, Corinth, MS (US); Jose F. Leon Torres, Peoria, IL (US); Stephen E Post, Peoria, IL (US); Robert E. Sharp, Corinth, MS (US)

(73) Assignee: Caterpillar Inc., Peoria, IL (US)

( * ) Notice: Subject to any disclaimer, the term of this patent is extended or adjusted under 35 U.S.C. 154(b) by 433 days.

(21) Appl. No.: 10/428,871

(22) Filed: May 2, 2003

(65) Prior Publication Data

US 2004/0216295 A1 Nov. 4, 2004

(51) Int. Cl.
*B23P 19/04* (2006.01)
*B23P 16/00* (2006.01)

(52) U.S. Cl. ............... 29/402.07; 29/402.01; 29/402.06; 29/402.09; 29/402.13; 29/402.16; 29/402.18; 228/227; 228/229; 228/232; 164/103

(58) Field of Classification Search ................ 29/402.01–402.09, 402.18, 888.011, 402.13, 29/402.16, 402.21, 530, 402; 228/227, 229; 228/232; 164/103
See application file for complete search history.

(56) References Cited

U.S. PATENT DOCUMENTS

| | | | |
|---|---|---|---|
| 1,777,531 A | 10/1930 | Peterson | |
| 2,120,525 A | 6/1938 | McKerihan | |
| 2,632,944 A | 3/1953 | Kittelson | |
| 2,751,671 A | 6/1956 | Welch et al. | |
| 3,192,618 A | 7/1965 | Altgelt | |
| 3,246,392 A * | 4/1966 | Altgelt | 228/103 |
| 3,392,435 A | 7/1968 | Swick et al. | |
| 3,445,914 A | 5/1969 | Altgelt | |
| 3,449,816 A | 6/1969 | Swick et al. | |
| 4,068,111 A | 1/1978 | Klumpes | |
| 4,878,953 A | 11/1989 | Saltzman et al. | |
| 4,918,805 A * | 4/1990 | Liszka et al. | 29/888.06 |
| 4,967,458 A * | 11/1990 | Rosenberg et al. | 29/888.011 |

(Continued)

FOREIGN PATENT DOCUMENTS

CN 1174772 A 3/1998

OTHER PUBLICATIONS

"The SRZ Welding Process", SRZ—Part 1, Issue 3, Aug. 2003, pp. 1-26.

(Continued)

*Primary Examiner*—George Nguyen
*Assistant Examiner*—Christopher M. Koehler
(74) *Attorney, Agent, or Firm*—Andrew J. Ririe; James R. Smith

(57) ABSTRACT

This invention relates generally to a method for repairing a casting, and more specifically to a method of repairing a casting by pouring melted filler material into a damaged portion of the original casting. Damaged cast metal components, such as a cylinder head of an internal combustion engine are repaired by preheating the component to a first preheat temperature. The damaged area of the casting is then heated to a higher temperature using a torch and melted filler material is poured into the casting. The torch is used to maintain the temperature of the melted material for thirty seconds to two minutes. The temperature of the filler material is then cooled using compressed air.

40 Claims, 4 Drawing Sheets

U.S. PATENT DOCUMENTS

| | | | |
|---|---|---|---|
| 5,193,272 A * | 3/1993 | Wortmann et al. | 29/889.1 |
| 5,284,442 A * | 2/1994 | Peterson | 433/223 |
| 5,427,305 A | 6/1995 | Nishimura | |
| 5,678,753 A * | 10/1997 | Stauder | 228/225 |
| 5,802,716 A | 9/1998 | Nishimura et al. | |
| 5,897,801 A | 4/1999 | Smashey et al. | |
| 6,109,505 A | 8/2000 | Malie et al. | |
| 6,422,295 B1 | 7/2002 | Larsson et al. | |
| 6,491,207 B1 * | 12/2002 | Smashey et al. | 228/119 |

OTHER PUBLICATIONS

"Chilled Sand Casting Process Delivers Higher Strength Components", Modern Casting, Jan. 2003, pp. 46-47, Spada.

* cited by examiner

METHOD FOR REPAIRING A CASTING

TECHNICAL FIELD

This invention relates generally to repairing castings, and more specifically to a process for repairing damaged material by pouring melted filler material to the solidified original casting.

BACKGROUND

Cast components often require repair during their life. Because of the physical characteristics of cast materials, it is difficult and time consuming to repair cast components. Typically repairs to castings involve removing damaged portions of the casting through machining, and subsequently rebuilding the damaged area by welding.

One example of a component that is susceptible to damage is the cylinder head of an internal combustion engine. Because of repeated heating and cooling of the engine, the cylinder heads often develop cracks near openings, such as valve seats, fuel injector bores, and exhaust ports. Another problem associated with cylinder heads is warping. When warped, the bottom surface of the head becomes uneven and does not seal properly. Some warped cylinder heads can be milled until the fireside surface is again flat. However, milling the surface reduces the thickness of the head, making the head more susceptible to future operating damage. Heads that can't be milled flat are typically scrapped. Current processes are unable to repair warped heads by building up the surface thickness.

One example of repairing a casting is discussed in U.S. Pat. No. 4,918,805 assigned to General Motors Corporation. This patent describes a method for repairing a cylinder head of an internal combustion engine by welding. Grinding or a similar machining process removes the damaged portion of the cylinder head. After the damaged material is removed it is replaced using a welding process. A drawback to using this or a similar process is that it is labor intensive to repair even a single crack. Many damaged heads have multiple cracks to be repaired. Each damaged portion being repaired must be removed, the entire head preheated, and then welded. During welding, the temperature of the surrounding area must be elevated and maintained high enough to permit sufficient bonding of the parent and filler material. After welding, the bead must be machined to original manufacturer's specifications. The welding repair process may take hours per cylinder head.

The present disclosure is directed to overcoming one more of the problems set forth above.

SUMMARY OF THE INVENTION

The present invention provides a method of repairing a cast component. A cast component is prepared and preheated to a first predetermined temperature and a quantity of melted filler material is poured onto the cast component.

BRIEF DESCRIPTION OF THE DRAWINGS

FIG. 3a is an enlarged sectional view of a portion of the cast component of FIG. 3 indicated as 3a.

DETAILED DESCRIPTION

Figure 2:
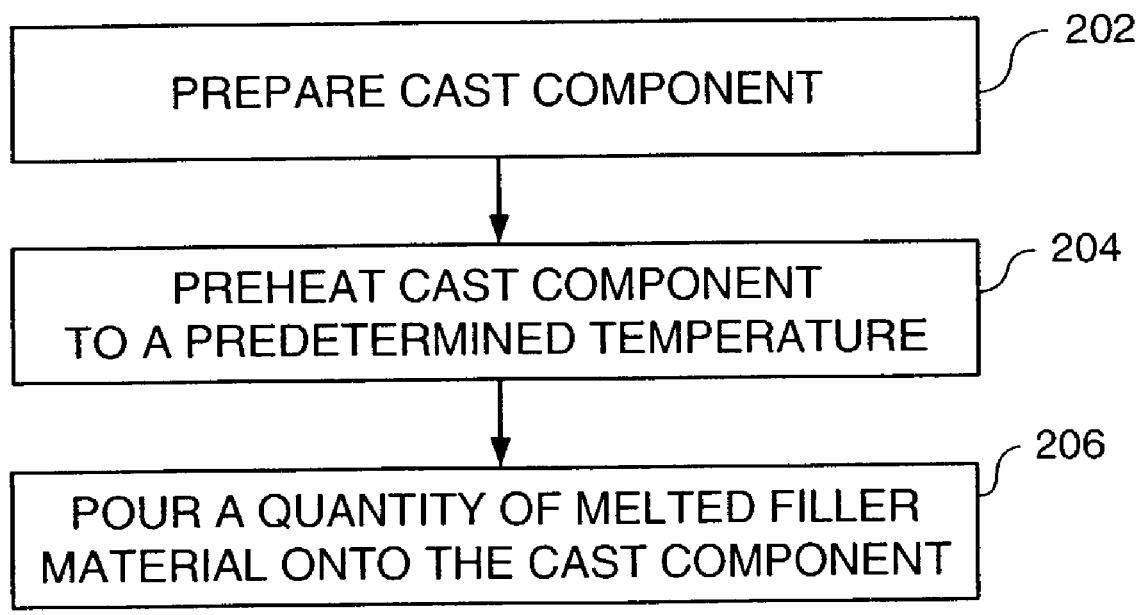
FIG. 2 is a flowchart describing the method of the claimed invention.

Referring first to FIG. 2, a flowchart showing an embodiment of the method of repairing a cast component is generally illustrated. In the first control block 202, the component is cleaned and inspected for damaged portions. Grinding or machining then removes damaged portions of the component. In the second control block 204, after damaged portions have been removed, the component is preheated to a predetermined temperature. The preheat temperature will vary depending on the type and thickness of material being repaired. It is desirable to preheat the component as much as possible without damaging the component. Depending on the component, types of damage include, stress relieving and warping caused by overheating. On the other hand, failure to preheat the component to high enough of a temperature may cause cracking of the parent material when the melted filler material is poured. In one embodiment, the preheat temperature for a cast iron cylinder head may be in the range of 950° F. to 2000° F. For a certain cylinder head, a preheat temperature of 1100° F. has been found to reduce stress and warping while reducing the risk of cracking. In the third control block 206, a quantity of filler material is melted and poured into the damaged portion of the cast component.

Figure 1:
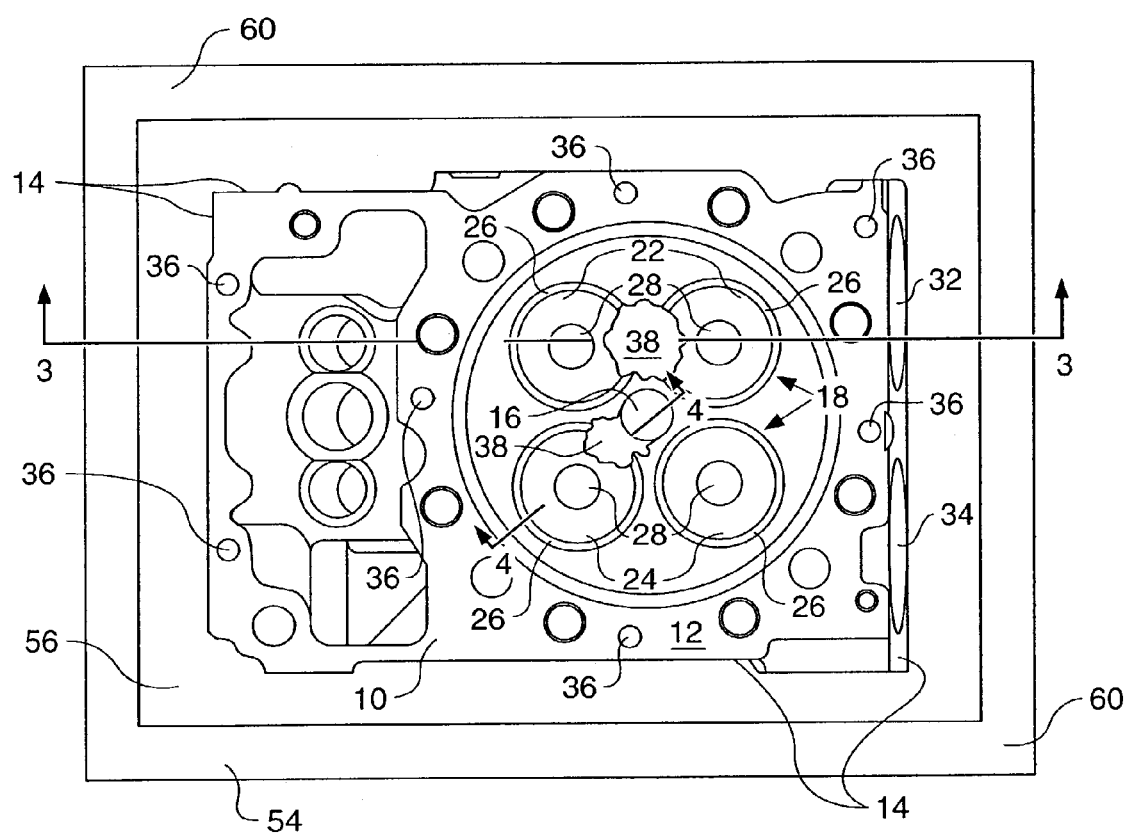
FIG. 1 is an illustration of a cast component adapted to repair using the present disclosure.

Referring to FIG. 1, a component manufactured from cast iron is illustrated. In this example the component is a cylinder head 10. It should be noted that the present invention is not limited to use with cylinder heads, the invention may additionally apply to any cast product. The invention may also be used on other cast metallic components such as, aluminum. For other metallic components preheat temperatures may be determined through experimentation or computer simulation. The cylinder head includes a bottom, or fireside surface 12, a plurality of side surfaces 14 and a top surface (not shown). The bottom surface 12 of cylinder head is adapted to be fastened to a cylinder block (not shown) of an internal combustion engine, in a typical manner. The bottom surface 12 of the cylinder head 10 includes a fuel injector opening 16 and two or more valve openings 18. As illustrated, the valve openings 18 include a pair of exhaust valve openings 22 and a pair of intake valve openings 24. The valve openings 18 may be evenly spaced about the fuel injector opening 16. Each valve opening 18 includes a valve seat 26 and a valve guide 28. A passage (not shown) is defined in the cylinder head 10 extending from each valve opening 18 to a respective one of an exhaust port 32 and an intake port 34. The intake and exhaust ports 32, 34 are typically defined in one of the side surfaces 14 of the cylinder head 10. The cylinder head 10 also includes a plurality of bores 36 adapted to receive bolts (not shown) for attaching the cylinder head 10 to the engine block. Internally, the cylinder head includes a plurality of fluid passages (not shown). The fluid passages include a coolant jacket and lubrication passages. The coolant jacket and lubrication passages function in a conventional fashion and will not be discussed in further detail.

Configured for operation with an internal combustion engine (not shown), the cylinder head 10 is assembled having a pair of exhaust valves (not shown) and a pair of intake valves (not shown) movably positioned in the valve openings 10. A rocker arm assembly (not shown) is additionally assembled on the cylinder head 10. To facilitate inspection and repair of the cylinder head 10, the intake valves, exhaust valves, rocker arm assembly and all other removable components are disassembled from the cylinder head 10.

INDUSTRIAL APPLICABILITY

Figure 3:
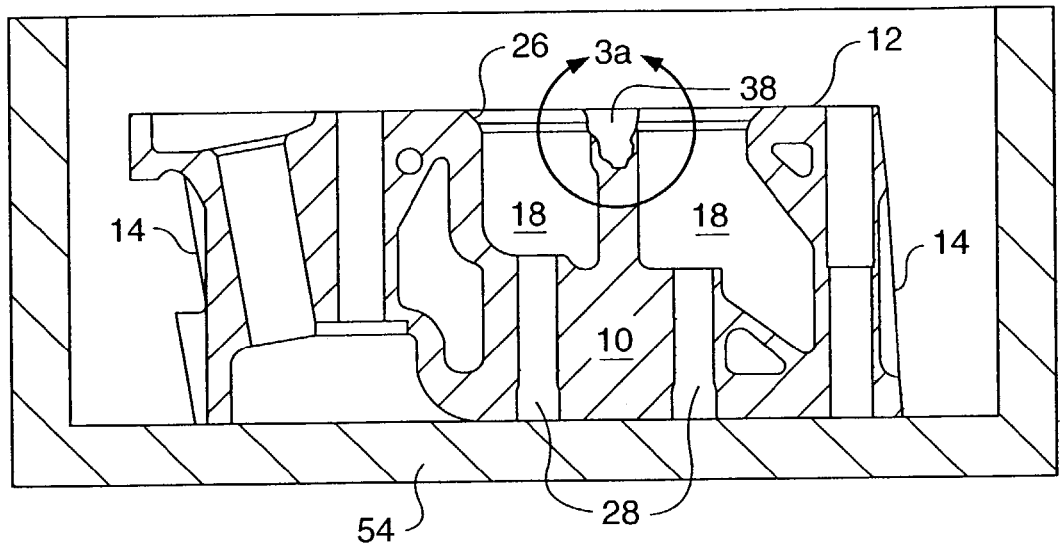
FIG. 3 is a sectional elevational view of the cast component of FIG. 1 taken along line 3—3.
Figure 3A:
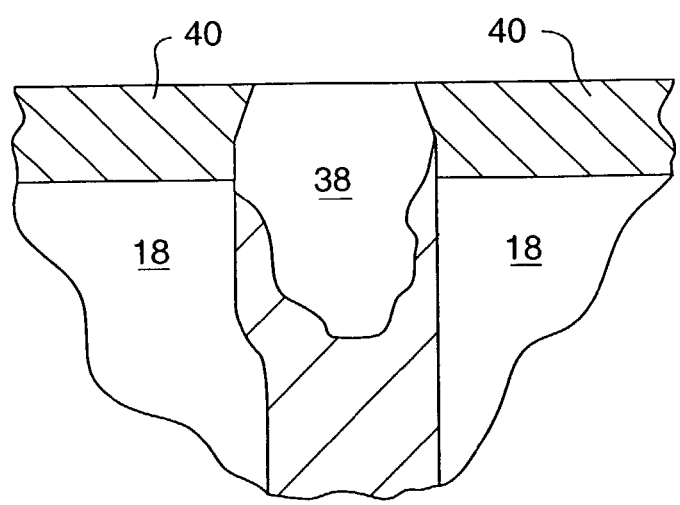

Referring now to FIGS. 3 and 3a, a method for casting molten filler material onto a solidified parent material will be described in detail. The casting, for example a cylinder head 10, is inspected for damage. Cracked, or otherwise, damaged portions of the cylinder head 10 are machined away to define cavities 38 in the bottom surface 12. In instances where cavities 38 extend into valve openings 18, plugs 40 (shown in FIG. 3a) may be inserted into the respective valve opening 18. The plugs 40 prevent the molten filler material from entering original features of the cylinder head 10. The plugs may be manufactured from a heat resistant material, such as machinable graphite. In one embodiment the plugs are capable of withstanding extreme temperatures without deforming and are thermally conductive. The plugs 40 may be of a variety of shapes and sizes to fill specific features. For example, a plug 40 to fill and protect a valve opening 18 is machined to a size and shape substantially equal to that of its respective valve.

Figure 4:
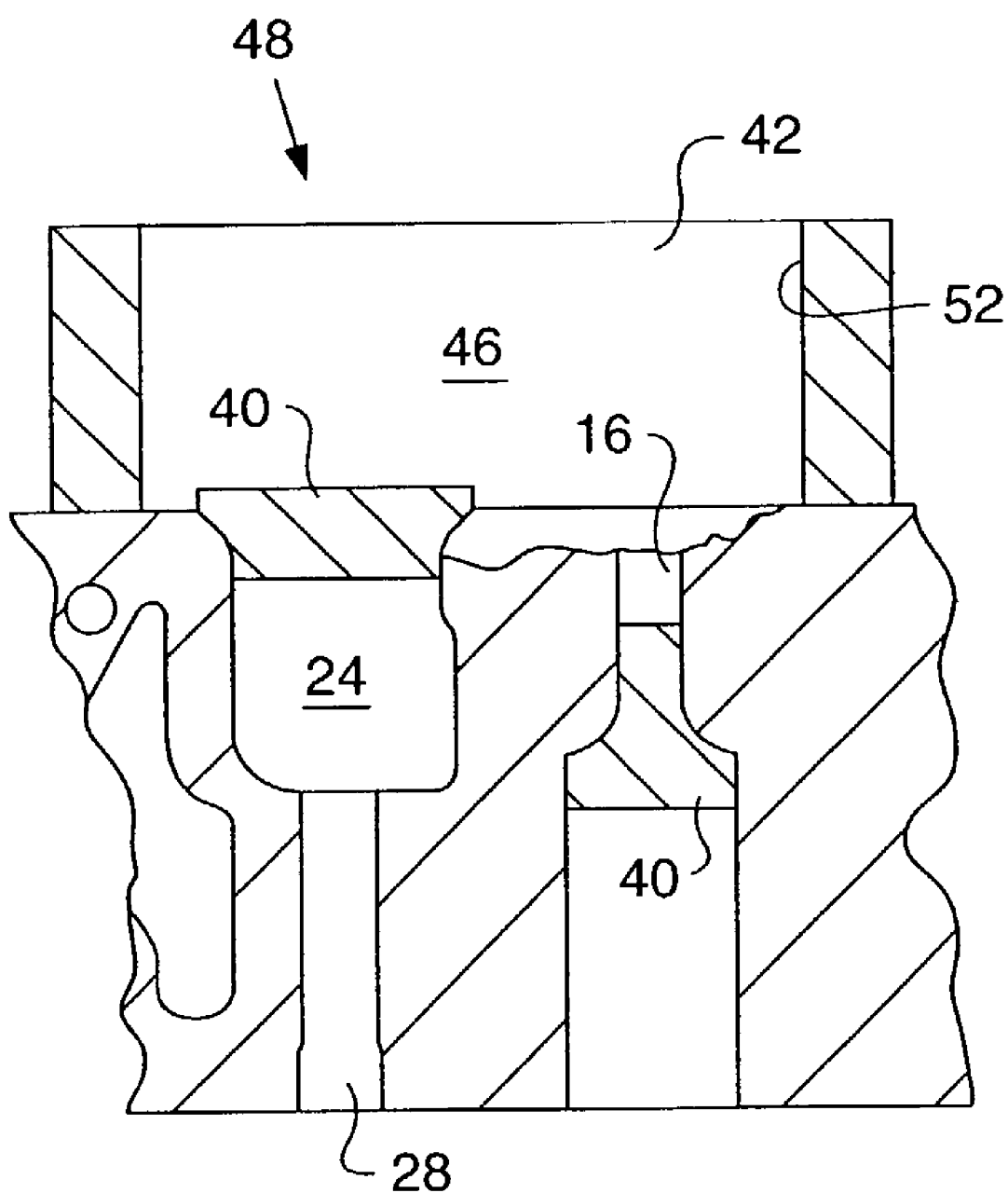
FIG. 4 is an enlarged sectional of the cast component of FIG. 1 taken along line 4—4 with plugs 40 and a dam 42 installed.

Referring to FIG. 4, after the damaged portion has been removed, a cavity 38 is defined between the fuel injector opening 16 and a valve opening 18. A plug 40 may be provided sized to fit the fuel injector opening 16. The plug 40 is pushed into the opening 16, preventing filler material from running through or otherwise filling the fuel injector opening 16. Additionally a dam 42 may be positioned around the fuel injector opening 16 on the bottom surface 12. The dam 42 may be positioned on the bottom surface 12 in a manner where pouring the molten material into the cavity 38 provides a riser 46 of filler material. The dam 42 may be made of machinable graphite similar to the plug 40. The riser 46 provides a surplus of filler material to allow for shrinkage during cooling. The graphite dam 42 may be manufactured by cutting a piece of machinable graphite stock to a desired thickness and boring or machining an opening 48 in the stock, thus defining an outer boundary 52.

As described in the second control block 204, the cylinder head 10 is preheated in an oven to a first temperature. In one embodiment the first temperature range is in the range of 950° F. to 2000° F., more preferably 1050° F. to 1150° F. From the preheat oven, the cylinder head, with the graphite plugs and dams in position, is moved to an electrically heated and insulated box 54 (shown in FIGS. 1 and 3). The heated box 54 may include a plurality of wheels adapted to permit moving the box 54 about a shop. The box 54 further defines opening 56, a bottom 58 and a plurality of side surfaces 60. The opening 56 includes a plurality of removable covers (not shown) adapted to close and maintain the temperature inside the box 54. The temperature inside the heated box 54 may be maintained at a temperature of in the first temperature range until filler material is added.

A quantity of filler material, such as cast iron, is prepared by melting. For example, the filler material is melted in a crucible and held in a furnace at a temperature sufficient to bond with the parent material. In the case of a cylinder head, the temperature may be approximately 2725° F. The filler material may be of a chemical composition similar to that of the cylinder head 10 or component to be repaired. In one embodiment, a torch having a rosebud tip is used to locally heat the area to be repaired to a second predetermined temperature.

The second predetermined temperature may also vary depending upon the type, mass and wall thickness of the parent material and the volume of filler material. The second predetermined range is hot enough to permit bonding of the parent and filler materials, but cool enough to prevent the filler material from melting through the parent material. The lower limit of the range may be determined through simulation and/or experimentation and may account for factors such as material shrinkage, bonding strength, microstructure, and stress associated the parent and/or filler material. Factors that impact bonding point may include type and volume of the parent material, the type and volume of the filler material, the chemistry of the parent component. Additionally, the second preheat temperature prevents rapid cooling of the filler material, in turn maintaining desired mechanical properties. In one embodiment, the second predetermined temperature may be between 1650° F. and 1975° F.

A quantity of welding flux (not shown) is applied to the surface to be repaired. The flux acts to remove oxidation and other contaminants from the filler material and cast component after the filler material is poured. A typical flux is manufactured from a borax-based material. With the temperature of the cavity 38 within the temperature range, melted filler material is removed from the furnace. Slag that may be floating on the surface of the molten filler material may be skimmed from the melted filler material. With the filler material substantially free of slag, it is poured into, and fills the cavity 38. In one embodiment, filler material may be permitted to overflow from the damaged area and rise above the bottom 12 surface. The temperature of the filler material in the cavity may be maintained at the second temperature for a time period by moving the torch about the filler material. For example the time period may be in the range of thirty seconds to two minutes. Moving the torch about the filler material allows trapped gas vapor and contaminants to be released and improves bonding of the filler material to the original cast component.

The cast component may then be allowed to cool. In one embodiment, the cast component, or a portion thereof, may be partially cooled using compressed air. A wand (not shown) having a diffuser attached thereto and being attached to a compressed air source is moved about, over the filler material. In one embodiment, to achieve desired mechanical properties, such as hardness and microstructure, it is desired to employ a cooling rate sufficient enough, depending on chemistry, to cool the entire volume of repaired area to achieve desired microstructure, or transformation products, of the matrix structure. For example using cast iron and dependent on the volume of material affected, it may be desired to bring the temperature of the repaired area down to a range of 1100° F. to 1200° F. in a time period of 30 to 180 seconds. After all repairs have been performed, the cylinder head 10 is slowly cooled, preferably, at a rate slow enough to avoid distortion or cracking of the component. The cylinder head 10 may then be machined to original specifications and reassembled for use.

What is claimed is:

1. A method of repairing defects on a metal part comprising:
   identifying an area on the part that contains a defect;
   machining a cavity in the part to remove the defect from the part;
   melting a filler material in a container;

placing the part in an oven to preheat the cavity to a temperature of at least 950 degrees F.; and pouring the molten filler material into the cavity preheated to at least 950 degrees F., the molten filler material further heating the cavity so that the filler material and cavity are chemically bonded after solidification.

2. The method of claim 1 wherein:

placing the part in an oven to preheat the cavity to a temperature of at least 950 degrees F. further comprises preheating the cavity to a temperature less than the melting temperature of the metal.

3. The method of claim 2 wherein the metal part is made from cast iron and the filler material is cast iron.

4. A method of repairing defects on a fireside surface of a metal cylinder head of an internal combustion engine comprising:

identifying an area on the fireside face of the cylinder head that contains a defect;

machining a cavity in the metal to remove the defect from the cylinder head;

preheating the cylinder head to a first temperature;

preheating the cavity to a second temperature greater than the first temperature and less than the melting temperature of the metal;

melting a filler material in a container;

pouring the molten filler material into the cavity, the molten filler material further heating the cavity so that the filler material and cavity are chemically bonded after solidification.

5. The method of claim 4 wherein the first temperature is at least 1000 degrees F.

6. The method of claim 4 wherein the cylinder head is cast iron and the filler material is cast iron.

7. The method of claim 6 wherein the first temperature is at least 1000 degrees F.

8. The method of claim 7 wherein the temperature of the molten cast iron filler material is at least 2400 degrees F. when the filler material is poured into the cavity.

9. The method of claim 7 wherein the temperature of the molten cast iron filler material is at least 2550 degrees F. when the filler material is poured into the cavity.

10. The method of claim 7 wherein the temperature of the molten cast iron filler material is at least 2700 degrees F. when the filler material is poured into the cavity.

11. The method of claim 9 further comprising cooling the cavity and the filler material to less than 1250 degrees F. in less than 180 seconds after the filler material is poured into the cavity.

12. The method of claim 9 further comprising cooling the cavity and the filler material to less than 1250 degrees F. in less than 120 seconds after the filler material is poured into the cavity.

13. The method of claim 9 further comprising cooling the cavity and the filler material to less than 1250 degrees F. in less than 60 seconds after the filler material is poured into the cavity.

14. The method of claim 12 further comprising applying additional heat to the filler material for several seconds after the filler material is poured into the cavity to allow gas bubbles to escape from the filler material before solidification.

15. The method of claim 14 wherein the additional heat is provided by a gas torch.

16. The method of claim 9 further comprising treating the cavity with a welding flux material to remove impurities from the surface of the cavity after the cavity is preheated to the second temperature and before the filler material poured into the cavity.

17. The method of claim 4 wherein the preheating of the cylinder head to the first temperature takes place in an oven.

18. The method of claim 17 wherein the preheating of the cavity to the second temperature is done by applying heat from a gas torch to the cavity.

19. The method of claim 18 wherein the cylinder head is removed from the oven and placed in an insulated box prior to heating the cavity to the second temperature.

20. The method of claim 4 further comprising:

filling one or more openings in the fireside surface of the cylinder head with a graphite plug to prevent the filler material from entering the opening.

21. A method of repairing defects on a metal part comprising:

identifying an area on the part that contains a defect;

machining a cavity in the metal to remove the defect from the part;

preheating the part to a first temperature;

preheating the cavity to a second temperature greater than the first temperature and less than the melting temperature of the metal;

melting a filler material in a container;

pouring the molten filler material into the cavity, the molten filler material further heating the cavity so that the filler material and cavity are chemically bonded after solidification.

22. The method of claim 21 wherein the first temperature is at least 1000 degrees F.

23. The method of claim 21 wherein the part is cast iron and the filler material is cast iron.

24. The method of claim 23 wherein the first temperature is at least 1000 degrees F.

25. The method of claim 24 wherein the temperature of the molten cast iron filler material is at least 2400 degrees F. when the filler material is poured into the cavity.

26. The method of claim 24 wherein the temperature of the molten cast iron filler material is at least 2550 degrees F. when the filler material is poured into the cavity.

27. The method of claim 24 wherein the temperature of the molten cast iron filler material is at least 2700 degrees F. when the filler material is poured into the cavity.

28. The method of claim 26 further comprising cooling the cavity and the filler material to less than 1250 degrees F. in less than 180 seconds after the filler material is poured into the cavity.

29. The method of claim 26 further comprising cooling the cavity and the filler material to less than 1250 degrees F. in less than 120 seconds after the filler material is poured into the cavity.

30. The method of claim 26 further comprising cooling the cavity and the filler material to less than 1250 degrees F. in less than 60 seconds after the filler material is poured into the cavity.

31. The method of claim 29 further comprising applying additional heat to the filler material for several seconds after the filler material is poured into the cavity to allow gas bubbles to escape from the filler material before solidification.

32. The method of claim 31 wherein the additional heat is provided by a gas torch.

33. The method of claim 26 further comprising treating the cavity with a welding flux material to remove impurities from the surface of the cavity after the cavity is preheated to the second temperature and before the filler material poured into the cavity.

34. The method of claim 21 wherein the preheating of the cylinder head to the first temperature takes place in an oven.

35. The method of claim 34 wherein the preheating of the cavity to the second temperature is done by applying heat from a gas torch to the cavity.

36. The method of claim 35 wherein the cylinder head is removed from the oven and placed in an insulated box prior to heating the cavity to the second temperature.

37. The method of claim 21 further comprising:
 filling one or more openings in the fireside surface of the cylinder head with a graphite plug to prevent the filler material from entering the opening.

38. A method of repairing defects on a metal part comprising:
 identifying an area on the part that contains a defect;
 machining a cavity in the part to remove the defect from the part;
 filling a hole in the cavity with a plug;
 melting a filler material in a container;
 preheat the cavity to a temperature of at least 950 degrees F.; and
 pouring the molten filler material into the cavity preheated to at least 950 degrees F., the plug preventing the molten filler material from flowing through the hole, and the molten filler material further heating the cavity so that the filler material and cavity are chemically bonded after solidification.

39. The method of claim 38 wherein:
 placing the pan in an oven to preheat the cavity to a temperature of at least 950 degrees F. further comprises preheating the cavity to a temperature less than the melting temperature of the metal.

40. The method of claim 39 wherein the metal part is made from cast iron and the filler material is cast iron.

* * * * *